(No Model.)

C. ROGERS.
Spring Motor.

No. 230,576.  Patented July 27, 1880.

Witnesses
D. P. Cowl
John D. Dyer

Charles Rogers
by Connolly Bros & McTighe
Attorneys.

UNITED STATES PATENT OFFICE.

CHARLES ROGERS, OF PITTSBURG, PENNSYLVANIA.

SPRING-MOTOR.

SPECIFICATION forming part of Letters Patent No. 230,576, dated July 27, 1880.

Application filed June 21, 1880. (No model.)

*To all whom it may concern:*

Be it known that I, CHARLES ROGERS, of Pittsburg, in the county of Allegheny and State of Pennsylvania, have invented certain new and useful Improvements in Spring-Motors; and I hereby declare the following to be a full, clear, and exact description of the invention, reference being had to the accompanying drawings, in which—

Figure 1:
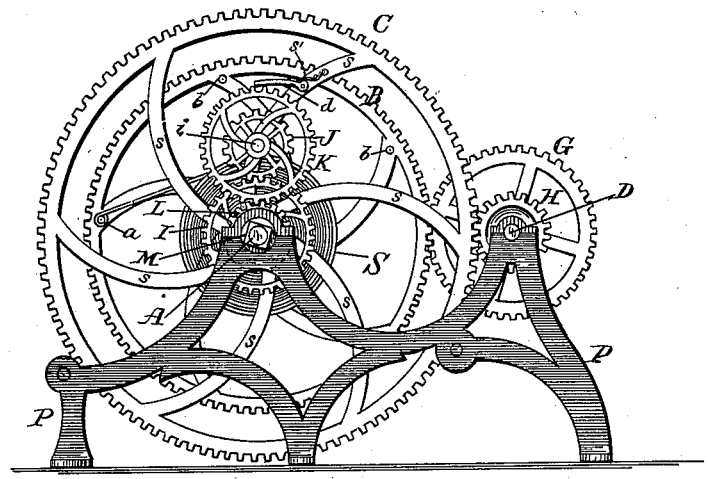
Figure 2:
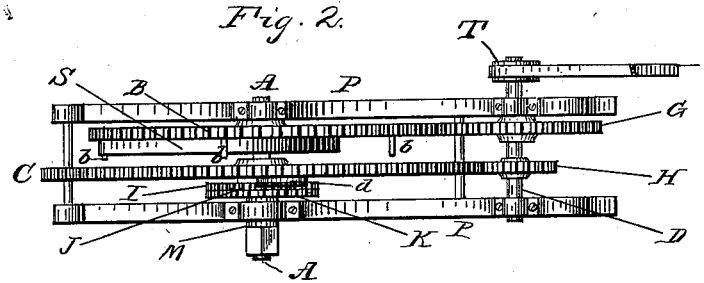
Figure 3:
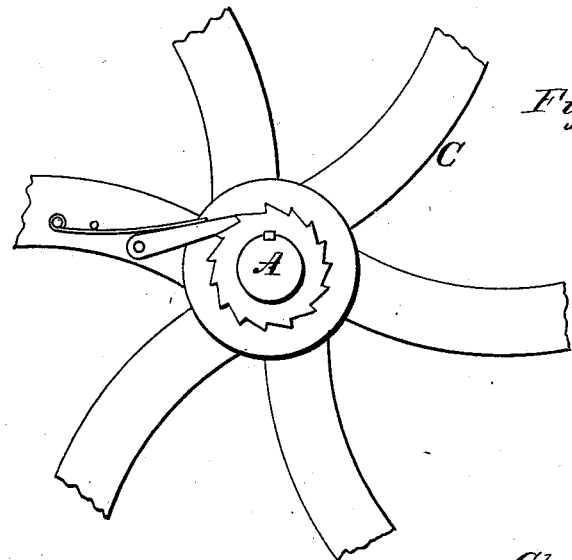

Figure 1 is a side elevation of my invention. Fig. 2 is a plan view of the same. Fig. 3 is a detail of modification, showing connection of wheel C to shaft A for light motors.

My invention has reference to the construction of spring-motors for all purposes to which such are applicable; and it consists in the novel arrangement and construction hereinafter fully described and claimed, whereby the necessary gearing is reduced to a minimum, and the work of the coiled spring is, so to speak, utilized partly in winding the spring up while the latter is operating, and thus enabling the motor to work through a much longer space of time.

In the drawings, A designates a shaft, upon which is a loose spur-wheel, B. To a wrist-pin, a, on this wheel is attached the outer end of a volute spring, S, the inner end being hooked on shaft A in the ordinary manner. Spring S thus stands alongside the wheel B, and is kept in proper limits by the pins b or a flange on wheel B. On the same shaft A, and beside the wheel B, so as to inclose the spring S, is another spur-wheel, C, larger in diameter than the wheel B, and also loose upon the shaft A. Wheel C has no direct connection with wheel B whatever.

A counter-shaft, D, is journaled in the frame P, parallel to shaft A, and on this are keyed the pinions G H, respectively, meshing with wheels B C, as shown. Now, when wheel B revolves under the influence of the volute spring it revolves pinion G and shaft D, and with them pinion H; but pinion H meshes with wheel C, so that when spring S, in uncoiling, rotates wheel B the effect is to also revolve wheel C in the direction required to wind the spring.

If, now, I connect the wheel C in any manner capable of clutching or revolving the shaft A my purpose is accomplished; but as a specific means I apply the following: On shaft A, beside wheel C, I key a small spur-wheel, I, which meshes with a loose pinion, J, set on a pin, i, projecting from wheel C, as shown. A spur-wheel, K, similar to wheel I, also revolves loosely on pin i, but is fixed to or cast with pinion J and meshes with a pinion, L, which is keyed on a hollow sleeve, M, fitting over the shaft A. Sleeve M is journaled in frame P, and has a square end for a winding-crank. Pin i projects from one of the spokes s of wheel C, and on the same or another spoke is a pawl, d, engaging the wheel K, being held thereto by a spring, s', as shown.

By the foregoing construction the spring S may be partially or wholly wound up from the square sleeve M while the apparatus is in motion, because with a crank the sleeve M may be revolved, which turns wheel K and pinion J, (both being prevented from recoil by the pawl d,) and from the latter the wheel L is revolved, and it being keyed to the shaft A, the latter is revolved and winds up the spring.

Instead of the winding mechanism just described, if a light motor is desired, it will suffice to use the form shown in Fig. 3, where a pawl, t, on one of the arms or spokes s of wheel C engages a ratchet on shaft A.

The machine proper includes only the four wheels B C G H and their shafts and spring S.

The operation of the device is curious and gives rise to a differential function, which enables me to build many different grades by altering the sizes of the two wheels B G without changing wheels C H in any respect.

As shown in the drawings, the wheels are proportioned, B G, as 2 to 1, respectively, and C H as 4 to 1, respectively. Hence, in uncoiling two revolutions normally of spring S the wheel B revolves twice on shaft A. This causes wheel G to revolve four times. Pinion H, being keyed on the same shaft, D, also revolves four times, which allows wheel C to revolve once; but wheel C being connected to shaft A through the winding mechanism, the single revolution it receives winds up one coil of the spring; or, to speak more correctly of the differential effect produced, while the spring S imparts two revolutions to wheel B, only one coil of the spring is unwound. Hence by the above proportions fifty percentum of the elastic power of the spring S is stored up again in coiling by the action of the wheel C, less, of course, the loss by friction.

By increasing the diameter of wheel B nearer to that of wheel C the unwinding of the spring in running down becomes more prolonged the nearer we approach equality of the wheels B C. When the two are of like diameter an equilibrium is established, the one having no advantage over the other, and no motion can take place.

It will be observed that in motion the wheel B travels faster than the wheel C. The less the difference the more slowly will the spring run down. This differential speed enables me to determine beforehand the proportions to employ for any given purpose. The power is taken from the motor to the machinery to be operated from a pulley, T, on shaft D.

I claim as my invention—

1. In a spring-motor in which the spring is attached one end to a main shaft and the other to a loose wheel upon said shaft meshing with a wheel upon a counter-shaft, the combination therewith of back gearing to said main shaft, whereby the power of the spring is divided, so as to allow part of its force to react and prolong the period through which the stored power of the spring is effective.

2. The combination of shaft A, wheel B, spring S, shaft D, with its wheels G D, and wheel C, provided with means, substantially as described, for preventing the slipping of shaft A.

3. The combination of sleeve M, pinion L, spur-wheel K, pinion J, pin $i$, spring-pawl $d$, and spur-wheel I with shaft A and wheel C, all arranged and operating substantially as described, whereby the spring may be wound while the motor is at work.

In testimony whereof I have hereunto set my hand.

CHAS. ROGERS.

Witnesses:
T. J. McTIGHE,
J. E. DUFFY.